US008578649B1

(12) United States Patent
Walsh et al.

(10) Patent No.: US 8,578,649 B1
(45) Date of Patent: Nov. 12, 2013

(54) WEIGHTED BASE WITH FRONT WALL ATTACHMENT RODENT BAIT STATION

(75) Inventors: James R. Walsh, Wauwatosa, WI (US); Daniel C. Johnson, Madison, WI (US)

(73) Assignee: Bell Laboratories, Inc., Madison, WI (US)

( * ) Notice: Subject to any disclaimer, the term of this patent is extended or adjusted under 35 U.S.C. 154(b) by 271 days.

(21) Appl. No.: 13/024,396

(22) Filed: Feb. 10, 2011

(51) Int. Cl.
*A01M 25/00* (2006.01)

(52) U.S. Cl.
USPC ............................. 43/131; 220/603; 248/910

(58) Field of Classification Search
USPC ............................. 43/131; 220/603; 248/910
See application file for complete search history.

(56) References Cited

U.S. PATENT DOCUMENTS

| | | | | |
|---|---|---|---|---|
| 1,964,611 A * | 6/1934 | Watson | ............................ | 43/131 |
| 2,568,168 A * | 9/1951 | Query | ............................ | 43/131 |
| 2,635,382 A * | 4/1953 | Kuntz | ............................ | 43/131 |
| 2,725,663 A * | 12/1955 | Mullen | ............................ | 43/131 |
| 2,944,364 A * | 7/1960 | Kelly | ............................ | 43/131 |
| 2,953,868 A * | 9/1960 | Chambers | ............................ | 43/131 |
| 3,008,262 A * | 11/1961 | Ronicker | ............................ | 43/131 |
| 3,471,114 A * | 10/1969 | Ball | ............................ | 248/910 |
| 3,488,879 A * | 1/1970 | Laughlin | ............................ | 43/131 |
| 4,208,829 A * | 6/1980 | Manning | ............................ | 43/131 |
| 4,349,982 A * | 9/1982 | Sherman | ............................ | 43/131 |
| 4,486,973 A * | 12/1984 | Faucillon | ............................ | 43/100 |
| 4,550,525 A * | 11/1985 | Baker et al. | ............................ | 43/131 |
| 4,637,162 A * | 1/1987 | Sherman | ............................ | 43/131 |
| 4,825,581 A * | 5/1989 | Dailey | ............................ | 43/131 |
| 5,016,848 A * | 5/1991 | Metz | ............................ | 248/910 |
| 5,033,229 A * | 7/1991 | Demarest et al. | ............................ | 43/131 |
| 5,040,327 A * | 8/1991 | Stack et al. | ............................ | 43/131 |
| 5,272,832 A * | 12/1993 | Marshall et al. | ............................ | 43/131 |
| 5,446,992 A * | 9/1995 | Stewart | ............................ | 43/131 |
| 5,448,852 A * | 9/1995 | Spragins et al. | ............................ | 43/131 |
| 5,713,694 A * | 2/1998 | Monda et al. | ............................ | 248/910 |
| 5,806,237 A * | 9/1998 | Nelson et al. | ............................ | 43/131 |
| 5,857,286 A * | 1/1999 | Doucette | ............................ | 43/131 |
| 5,897,018 A * | 4/1999 | Pruitt | ............................ | 220/603 |

(Continued)

FOREIGN PATENT DOCUMENTS

| | | | | |
|---|---|---|---|---|
| EP | 745323 A1 * | 12/1996 | ............ | A01M 25/00 |
| EP | 1201124 A2 * | 5/2002 | ............ | A01M 25/00 |

(Continued)

OTHER PUBLICATIONS

"A Bait Station With a Secured Block", Pest Management Professional, Aug. 2008, p. 8.

(Continued)

Primary Examiner — Darren W Ark
(74) Attorney, Agent, or Firm — Stiennon & Stiennon

(57) ABSTRACT

A bait station is mounted to a base. The bait station has the general shape of a box with a locking hinged lid. The box has side walls with openings so that rodents can enter into the box and gain access to poison bait or a mechanical trap. The base has a lower tray for receiving a weight. The bait station is releasably mounted to the base by a locking mechanism employing resilient finger which pass between a shroud on a side wall of the box to engage with portions of the wall forming an opening which is partly covered by the shroud so the fingers can be unlocked only by gaining access to the interior of the bait station box.

8 Claims, 7 Drawing Sheets

(56) References Cited

U.S. PATENT DOCUMENTS

| | | | |
|---|---|---|---|
| 5,966,863 A * | 10/1999 | Payton et al. | 43/131 |
| 5,987,811 A * | 11/1999 | Wiesener et al. | 43/131 |
| 6,082,042 A * | 7/2000 | Issitt | 43/131 |
| 6,145,242 A * | 11/2000 | Simpson | 43/131 |
| 6,164,010 A * | 12/2000 | Snell et al. | 43/131 |
| 6,266,917 B1 * | 7/2001 | Hight | 43/131 |
| 6,370,813 B1 * | 4/2002 | Nelson et al. | 43/131 |
| 6,370,814 B1 * | 4/2002 | Curtis et al. | 43/131 |
| 6,378,243 B1 * | 4/2002 | Snell et al. | 43/131 |
| 6,397,517 B1 * | 6/2002 | Leyerle et al. | 43/131 |
| 6,470,622 B1 * | 10/2002 | Braun | 43/131 |
| 6,474,015 B1 * | 11/2002 | Lund et al. | 43/131 |
| 6,493,988 B1 * | 12/2002 | Johnson | 43/131 |
| 6,508,377 B1 * | 1/2003 | Griswold et al. | 220/908 |
| 6,513,283 B1 * | 2/2003 | Crossen | 43/131 |
| 6,543,182 B2 * | 4/2003 | Snell et al. | 43/132.1 |
| 6,615,535 B2 * | 9/2003 | Snell et al. | 43/131 |
| D515,175 S | 2/2006 | Mayo et al. | |
| 7,204,054 B2 | 4/2007 | Mayo et al. | |
| 7,213,869 B1 * | 5/2007 | McClellan | 248/910 |
| 7,735,258 B2 * | 6/2010 | Vickery | 43/131 |
| 7,762,418 B1 * | 7/2010 | Natale | 220/630 |
| 7,861,458 B2 * | 1/2011 | Apps et al. | 220/603 |
| 7,874,098 B2 * | 1/2011 | Vickery et al. | 43/131 |
| 7,980,023 B2 * | 7/2011 | Nelson et al. | 43/131 |
| 8,028,468 B1 * | 10/2011 | Walsh et al. | 43/131 |
| 8,209,900 B2 * | 7/2012 | Vickery et al. | 43/131 |
| 8,302,345 B2 * | 11/2012 | Nelson et al. | 43/131 |
| 8,387,305 B2 * | 3/2013 | Cink et al. | 43/131 |
| 8,516,740 B2 * | 8/2013 | Vickery et al. | 43/131 |
| 2002/0043018 A1 * | 4/2002 | Townsend | 43/131 |
| 2005/0028431 A1 * | 2/2005 | Hoyes et al. | 43/131 |
| 2006/0117644 A1 * | 6/2006 | Hoyes et al. | 43/131 |
| 2009/0000182 A1 * | 1/2009 | Cink | 43/131 |
| 2009/0056199 A1 * | 3/2009 | Reed | 43/131 |
| 2009/0307963 A1 * | 12/2009 | Abbas | 43/131 |
| 2010/0031557 A1 * | 2/2010 | Vickery et al. | 43/131 |
| 2010/0251598 A1 * | 10/2010 | Vickery | 43/131 |
| 2010/0313466 A1 * | 12/2010 | Vickery | 43/131 |
| 2011/0072709 A1 * | 3/2011 | Patterson et al. | 43/131 |
| 2011/0219666 A1 * | 9/2011 | Vickery | 43/131 |

FOREIGN PATENT DOCUMENTS

| | | | | |
|---|---|---|---|---|
| GB | 2023987 A | | 1/1980 | |
| GB | 2382515 A | * | 6/2003 | A01M 25/00 |
| GB | a01 m | * | 8/2003 | A01M 25/00 |
| GB | 2391159 A | * | 2/2004 | A01M 25/00 |
| GB | 2394642 A | * | 5/2004 | A01M 25/00 |
| JP | 2009159938 A | * | 7/2009 | A01M 25/00 |
| WO | WO 9963812 A1 | * | 12/1999 | A01M 25/00 |
| WO | WO 2004098281 A1 | * | 11/2004 | A01M 25/00 |
| WO | WO 2005006857 A2 | * | 1/2005 | A01M 25/00 |
| WO | WO 2010028378 A2 | * | 3/2010 | A01M 25/00 |
| WO | WO 2010149990 A2 | * | 12/2010 | A01M 25/00 |
| WO | WO 2010149991 A2 | * | 12/2010 | A01M 25/00 |

OTHER PUBLICATIONS

U.S. Appl. No. 12/431,616, filed Apr. 28, 2009, "Bait Station and Detachable Bait Station".

Publication "The Bell Report" Apr.-Jun. 2009.

Photos of Protecta® LP Rodent bait station, 2009, manufactured by Bell Laboratories, Inc., Madison, WI.

* cited by examiner

WEIGHTED BASE WITH FRONT WALL ATTACHMENT RODENT BAIT STATION

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention is related to bait stations in general and to rodent bait stations in particular, and more particularly to rodent bait stations and means for anchoring them to a structure or the ground.

Rodents such as mice and rats, which are often exotic species introduced by the spread of civilization, are serious pests which carry diseases and consume and spoil food for use by domestic animals and humans. A common and effective method for eliminating rodents is to employ poison bait. The poison bait is most effectively contained in a bait station, which is a box or container which controls access to the poison bait, limiting access to the poison to the targeted pests. The bait station, and the bait in the form of a bait block, is often designed so that the bait block is pinned or otherwise confined within the bait station. By pinning the bait block in place it is not easily removed by the targeted pests but rather must be consumed within the bait station. To prevent a bait station from being tipped over or moved, the station is often physically attached to a mounting surface, structure, or ballast weight, using glue, twisted wire, adhesives, or fasteners. The bait station normally incorporates a lock which allows the station to be opened and the consumption of bait to be monitored or replaced. However, as the rodents consume the bait, the interior of the bait station becomes soiled with droppings, bits of bait block and other materials such that it is desirable to be able to free the bait station from the structure or ballast to which it is mounted so that the interior of the bait station may be emptied by inverting the main station. There is a conflict between fixedly mounting the bait station, and the simplicity of cleaning the bait station by turning it upside down and knocking out the debris.

SUMMARY OF THE INVENTION

The bait station system of this invention employs a bait station mounted to a base. The bait station has the general shape of a box with a locking hinged lid. The box has side walls with openings so that rodents can enter into the box and gain access to poison bait or a mechanical trap. The base has a lower tray for receiving a weight, such as one or two concrete paver blocks. The lower tray has a lower surface which may be glued to a planar surface, for example the floor of the building. The lower tray has one or more holes such that a screw or bolt or earth anchor may pass through the lower tray to attach the base to a planar surface. The base may be anchored to a planar surface by to the force of gravity acting on the weight contained in the base, or may be attached to the ground or a structure by glue or a mechanical anchor of some type. The bait station is releasably mounted to the base by a locking mechanism which can be unlocked only by gaining access to the interior of the box forming the bait station.

Access to the interior of the bait station is controlled by a key lock, so the bait station cannot be separated from the base without the key which provides access to the interior of the bait station. However, once the bait station is opened to determine whether it has been visited by the targeted pest, the bait station can be readily detached from the base, so the bait station may be cleaned by inverting, replaced with another bait station, or temporarily moved to a work area.

The locking arrangement between the base and the bait station may be arranged as two keyed posts which pass through openings in a first wall of the bait station, the keyed portion of the posts being passed through the opening by tilting the bait station and the one wall so that the first wall is at an acute angle with respect to the axes of the posts, so that when the first wall is made perpendicular to the axes of the posts, the keyed portions of the posts lock the posts to the first wall of the base. In combination with the keyed posts, the base has at least one elastically biased latch which passes through an opening in a portion of a second wall of the box of the bait station which is opposite and spaced from the first wall through which the keyed posts pass into the bait station. When the bait station is returned to a position such that the first wall is perpendicular to the axis of the keyed posts, a ramp on the elastically biased latch riding against portions of the front wall forces deflection of the latch surface outwardly allowing latch surface to pass up along the outside surface of the second wall. When the latch slides over an opening in the wall of the box, the latch elastically springs through the opening in the box second wall. The opening in the second wall of the box is positioned and sized so that when the latch surface passes through the opening in the wall and the latch returns to an unbiased position, the downwardly facing latch surface engages the lower edge of the opening in the second wall of the box thereby locking the front wall of the bait station to the bait station base.

It is a feature of the present invention to provide a bait station system in which a bait station is releasably connected to a base.

It is another feature of the present invention to provide a bait station system in which a bait station can be mounted to prevent movement of the bait station, and at the same time can be readily unmounted to permit movement of the bait station.

It is a further feature of the present invention to provide a bait station with a keyed entry which also provides access to a mechanism for releasing the bait station from a fixed base.

It is yet another feature of the present invention to provide a bait station system which divides the functions typically performed by a bait station between two releasable components.

Further objects, features and advantages of the invention will be apparent from the following detailed description when taken in conjunction with the accompanying drawings.

DESCRIPTION OF THE PREFERRED EMBODIMENTS

Figure 1:
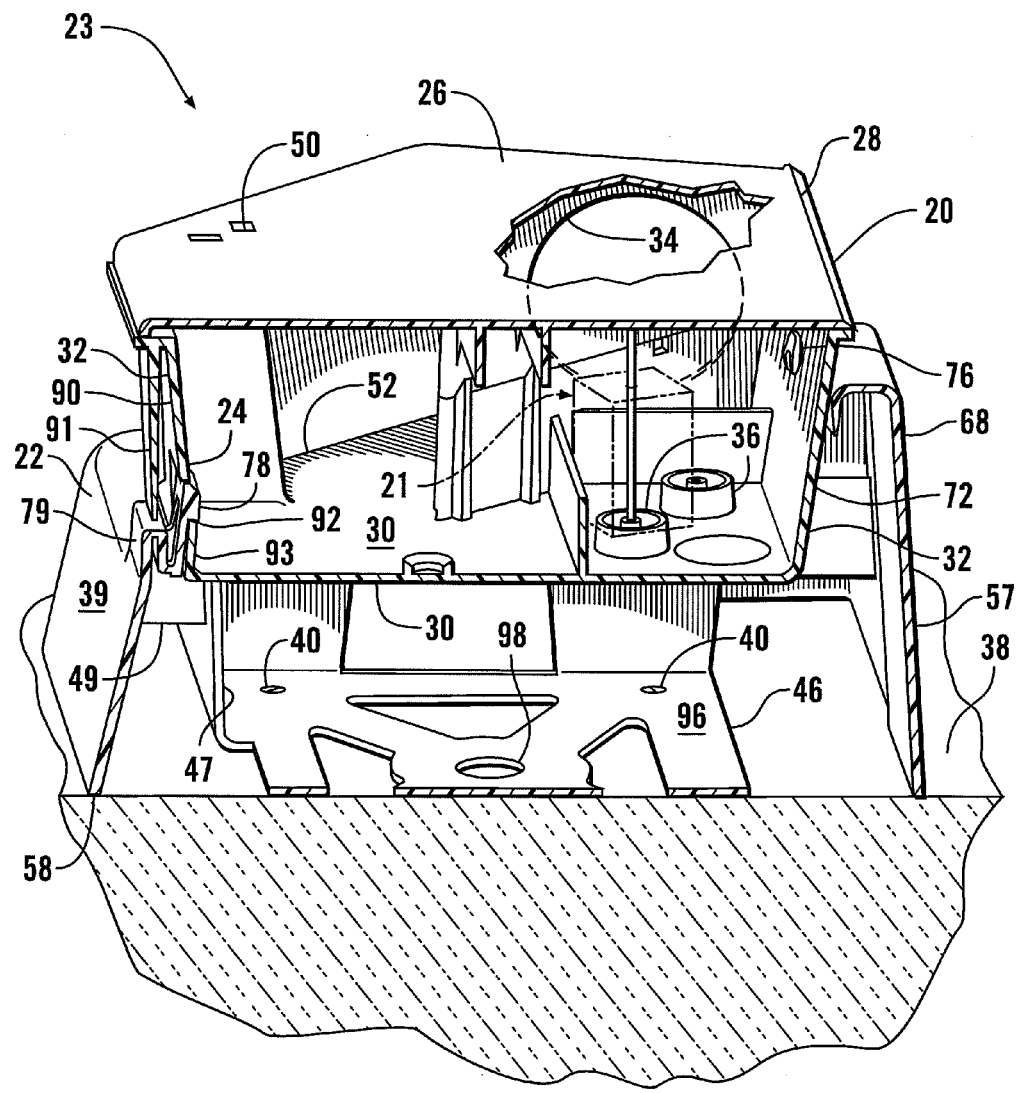
FIG. 1 is a side elevational cross-sectional view of the bait station mounted to a base of this invention.
Figure 2:
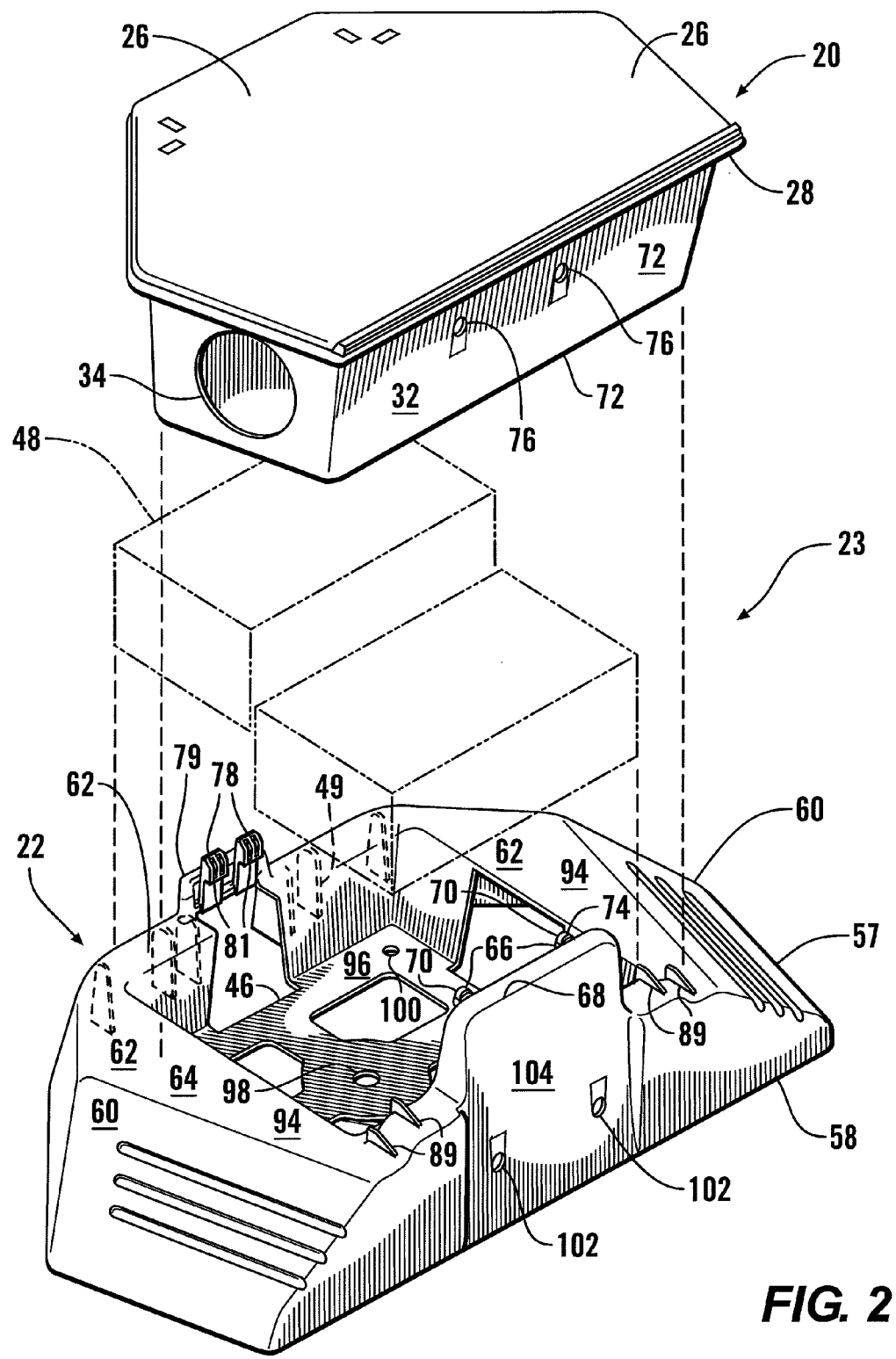
FIG. 2 is an isometric view of the base and bait station of FIG. 1 with weights shown in exploded view.

Referring more particularly to FIGS. 1-10 wherein like numbers refer to similar parts, a bait station 20 mounted to a base 22 forming a bait station system 23 is shown in FIG. 1. The bait station 20 is generally configured in accordance with the disclosure of U.S. Pat. No. 5,448,852 which is incorporated herein by reference. The bait station 20 comprises a molded plastic box 24 having a lid 26 joined to the box by an integrally formed hinge 28. The box 24 has a floor 30 and upwardly extending side walls 32, including a rear or first wall 72, and a front or second wall 90 which is opposite the rear wall. The side walls 32 have two openings 34, as shown in FIGS. 1 and 2 to permit entry and egress of rodents. Rodenticide bait 21 is positioned within the bait station with respect to molded barriers and support structures 36 which retain and position the bait.

A bait station such as disclosed in U.S. Pat. No. 5,448,852 benefits from being anchored to the ground, or other structure on which it is mounted. Such mounting prevents the bait station from being moved or rodenticide from being spilled by the tipping of the bait station. However, anchoring the bait station makes it more difficult to clean the bait station, by, for example, turning it upside down and knocking against the side of a waste container. The base 22 provides the benefit of fixedly mounting the bait station 20 while retaining the advantages of being able to easily release the bait station 20 so it can be cleaned. The base 22 is arranged to rest on a support surface 38 such as the ground or a floor or structural member of a building. Base side walls 39 extend up from the support surface 38 and serve to elevate the bait station 20 above blocks 48 or other weights retained within the base.

Figures 3, 4, 5:
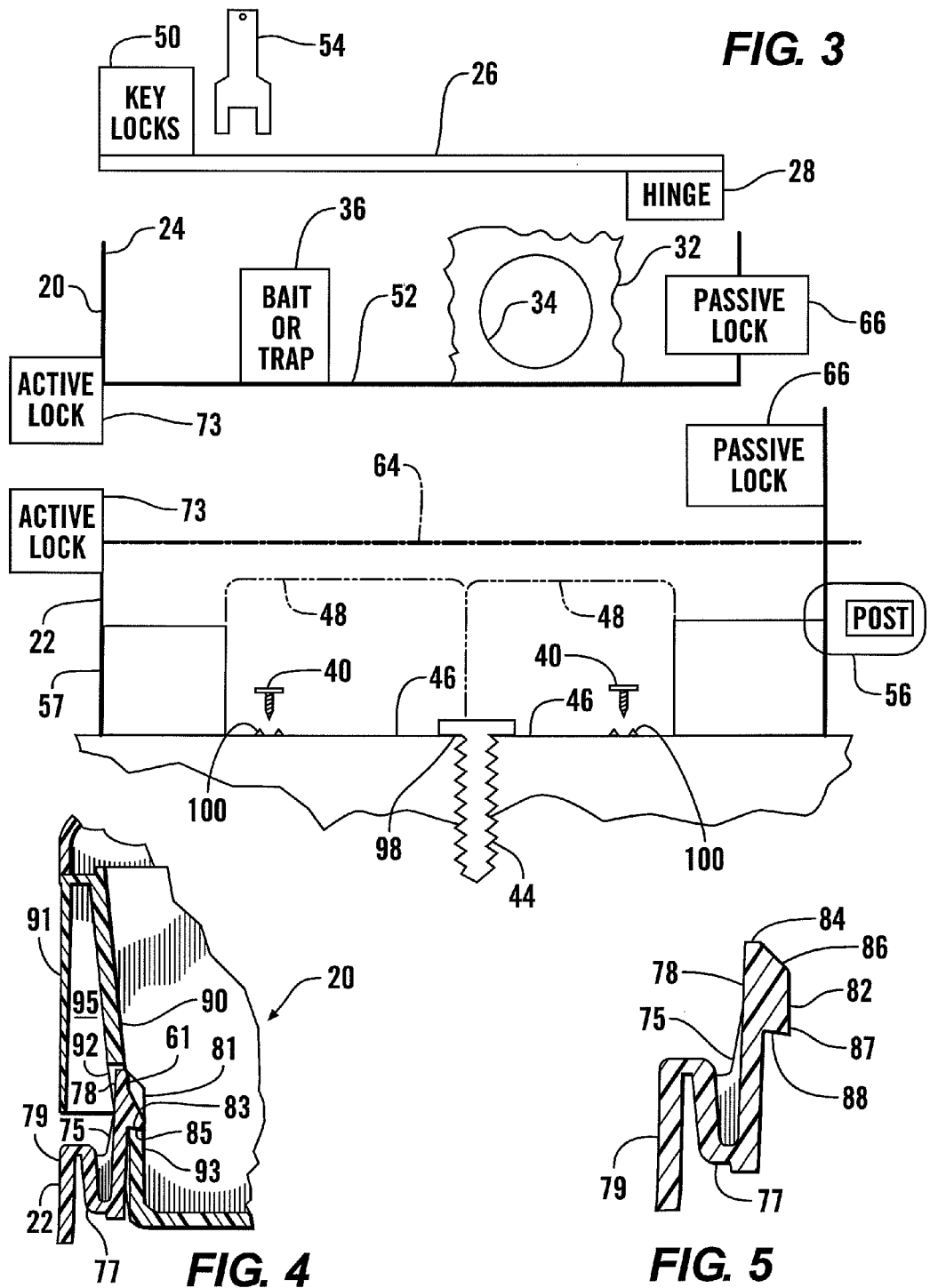
FIG. 3 is a schematic view of the bait station mounted to the base of this invention.
FIG. 4 is a fragmentary cross-sectional view of a side wall connection between the bait station and base of FIG. 1.
FIG. 5 is a fragmentary cross-sectional view of the base portion only of the connection of FIG. 4, taken along a plane offset sidewardly from the section view of FIG. 5.

The base 22 has structures which aid in holding it in place with respect to the support surface 38, either by adding weight to the combined assembly, or by facilitating the engagement of the base by fasteners such as screws 40, a ground anchor 44 as shown in FIG. 3, an adhesive such as LIQUID NAILS® adhesives manufactured by the Liquid Nails Division of ICI Paints of Strongsville, Ohio, or a wire or cord 56 which extends about a structural member, as shown schematically in FIG. 3.

For adding weight to the assembly, the base 22 has portions which form a tray 46 as shown in FIG. 1. The tray 46 has a floor 96 with upwardly extending side walls 47. The tray side walls 47 are spaced within the base side walls 39, and may be connected to the base side walls by stiffening ribs 49 as shown in FIGS. 1 and 2. A ballast weight 48 which may be one or two bricks or concrete pavers is placed on the floor 96 of the tray 46 within the side walls so that gravity acting on the pavers holds the base 22 to the support surface 38. Alternatively, the weight may be a conventional weight-lifting disc or plate (not shown) received within the tray 46.

The bait station 20 incorporates a pair of locks 50 which are operable by a key 54 shown in FIG. 3. One lock 50 is shown in FIG. 1, and is shown schematically in FIG. 3 and disclosed in detail in U.S. Pat. No. 5,448,852. The locks 50 serve to control the entry into the interior 52 of the bait station, where the rodenticide is held in the bait holding structures 36. By arranging locking structures (described below) between the base 22 and the bait station 20 which can only be unlocked by gaining access to the interior 52 of the bait station 20, the same key control system also controls access to the ability to separate the bait station from the base 22.

As shown in FIGS. 1 and 2, the base 22 has an injection molded shell structure 57. The side walls 39 of the shell structure 57 have a lower peripheral edge 58 which rests in contact with the support surface 38. As shown in FIG. 2, the shell structure 57 extends upwardly along a pair of symmetrically arranged ramps 60 to a platform 62, which defines a horizontal plane 64 on which the bait station 20 is positioned. Between the ramps 60 on opposite sides of the platform 62 are arranged the locking structures between the bait station and the base.

Figure 6:
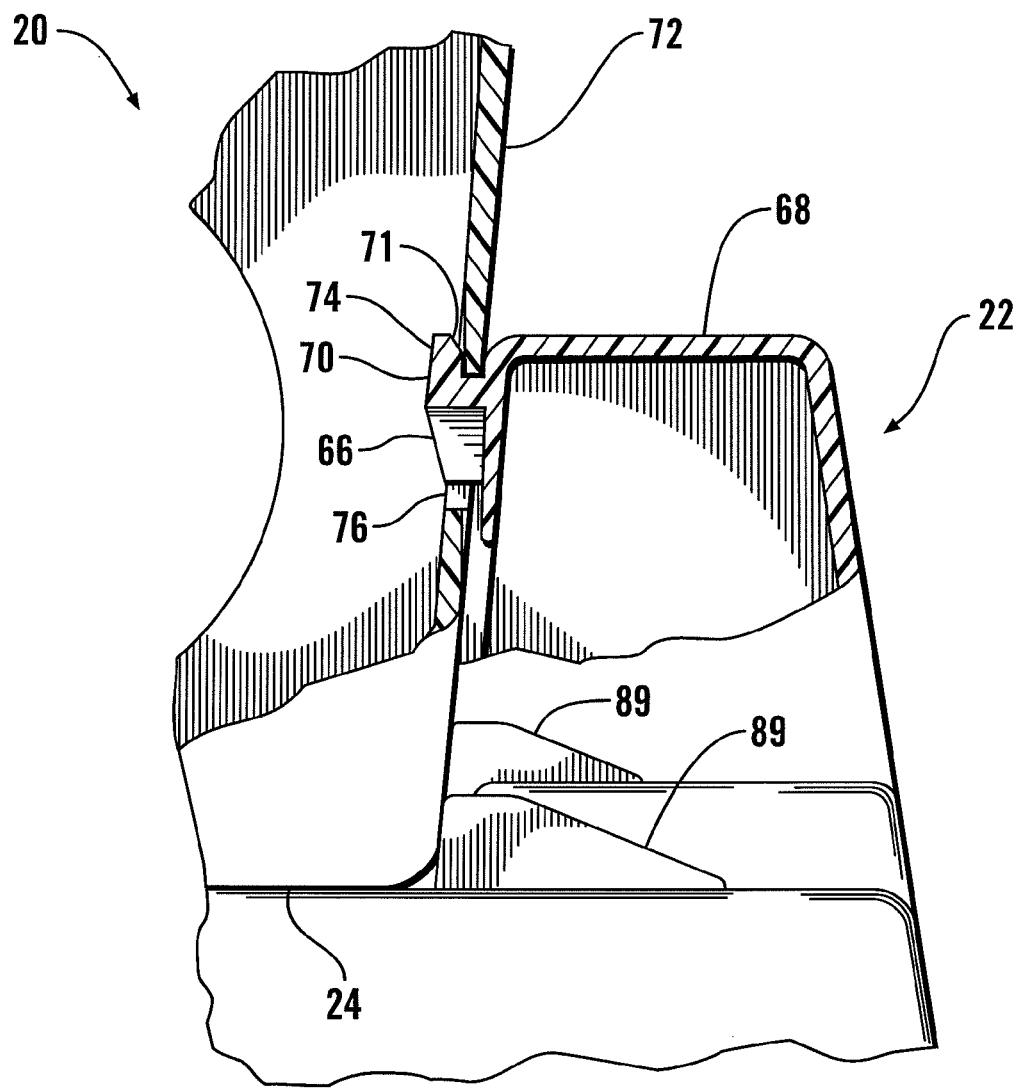
FIG. 6 is a fragmentary side view, partially broken away in section, of the side wall connection between the bait station and base of FIG. 1.

One set of fixed locking structures comprises two posts 66 which extend towards the bait station from an upwardly projecting mounting structure 68 shaped somewhat like a bookend. The two posts 66 extend over and parallel to the horizontal plane 64 defined by the platform 62. The mounting structure 68 is positioned between the ramps 60 and terminates one side of the platform 62 on which the bait station 20 is positioned and locked to the base 22. Each post 66 has an end 70 distal from the mounting structure. The distal end 70 has locking portions 74 which extend unsymmetrically and upwardly of the distal end 70. As shown in FIG. 6, the locking portions have an upper cam surface 71 which is inclined away from the mounting structure 68 to aid in aligning the rear wall 72 on the posts as the bait station is mounted to the base 22.

The bait station 20 rear wall 72 is part of the upwardly extending walls 32 of the box 24 and has portions forming a pair of mounting holes 76, shown in FIG. 2, which correspond to and are arranged for receiving the posts 66. The posts 66 have cross-sections which correspond substantially to the shapes of the holes 76, however the holes 76 are arranged so that they cannot accommodate the locking portions 74 when the rear wall 72 is moved in the horizontal plane 64. However, if the rear wall 72 is tipped towards the mounting structure 68 approximately 30° from the vertical, and passed first over the locking portions 74 of the posts 66, the rear wall 72, and the bait station 20 can then be pivoted to the horizontal so that the posts extend through the holes 76, locking the bait station against horizontal movement to the posts and to the mounting structure 68.

The fixed locking structures formed by the posts 66 are complemented by barbed latching fingers 78, shown in FIGS. 4 and 5, which extend upwardly from the base 22 as part of a second and shorter bookend structure 79. The fingers 78 engage within mounting holes defined by openings 92 formed by portions of the front wall 90 of the bait station 20 as shown in FIG. 4. The latching downwardly facing surfaces 88 of fingers 78 engage with lower edges 83 of the bait station openings 92 which receive the barbed latching fingers 78. The fingers 78 prevent the front of the bait station 20 from being pivoted upwardly, which, in cooperation with the posts 66, effectively locks the bait station 20 to the base 22. The barbed latching fingers 78 are located opposite the mounting structure 68, and are formed with the injection molded shell 57. The latching fingers 78 extend upwardly from the platform 62 and the shorter bookend structure 79. A portion of each of the latching fingers 78 forms a barb 82 defined by an apex 84 with a downwardly extending ramp 86 connecting to a vertical surface 87 which terminates in the locking downwardly facing surface 88. As shown in FIGS. 2 and 6, a pair of grooves 81 extend along the ramp 86 and the vertical surface 87 which provide an aggressive gripping surface which facilitates the application of pressure to the latching fingers 78, to release the fingers from engagement to the bait station 20. The resilience of the latching fingers is controlled by a web 75 between each latching finger 78 and a u-shaped extension of the latching finger which connects it to the shorter bookend structure 79. The stiffness of the resilient deflection can be controlled in the design of the latching fingers 78 by tuning the thickness and shape of the web 75.

Figure 7:
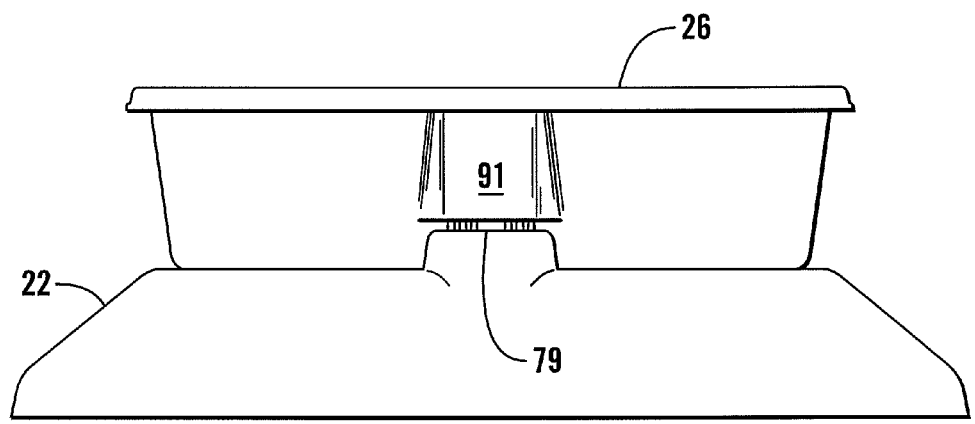
FIG. 7 is a front elevational view of the bait station of FIG. 1 showing a shroud which covers the fingers which latch the base to the front of the bait station.

To prevent the latching fingers 78 from being actuated from outside the bait station 20, the bait station has a shroud 91, shown in FIGS. 1 and 7, which extends from the front wall 90 and extends downwardly to cover and wrap around the openings 92 in the front wall 90, and thus shield the latching fingers 78 when they are latched in the openings 92 from operation from the outside of the bait station 20. An intermediate rib 95, as shown in FIG. 4, extends from the front wall between the openings 92 to a midpoint of the shroud 91, so that the shroud is attached along three lines to the bait station front wall 90. The openings 92 in the front wall 90 are rectangular and the lower edges 83 of the opening are formed by portions of front wall having slightly raised ramps 85 leading to outside of the front wall 90. The ramps 85 are provided so that the locking downwardly facing surface 88 of a latching finger is substantially supported near the outside of the opening 92, as shown in FIG. 4. Such a supporting arrangement increases the resistance to the wall 90 of the bait station 20 being pulled over the barbs 82, and helps to retain the assembly in a locked condition. As best shown in FIG. 5, the downwardly facing surface 88 is preferably inclined to match the inclination of the ramp 85.

To mount the bait station 20 to the base 22, the bait station is tilted so that the floor 30 makes an angle of approximately 30° with the plane 64 of the platform 62. The holes 76 in the rear wall 72 of the bait station are positioned over the posts 66 so that portions of the rear wall rest on the posts. The bait station 20 is then pivoted downwardly so that inwardly leaning portions 93 of the front wall 90 leading to the openings 92 engage the ramps 86 of the barbs 82 as the wall 90 passes by the apex 84 of the latching fingers 78. The operation of the wall pressing downwardly on the ramps 86 forces the latching fingers 78 and the attached barbs 82 to deflect away from the front wall 90 allowing the two barbs 82 to pass along the front wall 90 until the barbs reach the openings 92. The latching fingers 78 are sufficiently resilient so they return to their undeflected position, and pass through the openings 92 such that the locking surfaces 88 are now in opposition to the lower edges 83 of the openings 92, preventing upward movement or tilting of the bait station 2 as shown in FIGS. 1 and 4.

As shown in FIGS. 2 and 6, the base 22 is preferably provided with fins 89 which project upwardly at the rear of the base on either side of the mounting structure 68. As best shown in FIG. 6, the fins 89 are narrow plate-like elements about 1/16 inches thick, and may be about one inch long and from 1/4 to 3/4 inches tall. The fins 89 are positioned to engage the rear wall 72 of the bait station and serve to stiffen the combined structure to help to prevent shifting of the bait station with respect to the base when the assembly is subjected to impact. If the bait station shifts horizontally too much, there is the possibility that the flexible latching fingers 78 will come out of engagement with the openings 92 in the bait station front wall 90, thereby allowing the bait station to become separate from the base. The fins 89 help to prevent this shifting, and thus resist separation of the bait station from the base when either is struck.

To remove the bait station 20 from the base 22, the key 54 is used to open the lid 26, gaining access to the interior of the box 24 where rodenticide and/or mechanical traps are positioned. When an operator has gained access to the interior of the bait station 20, the latching fingers 78 are readily released from overlying the lower edge 83 of the openings 92 by pushing in the horizontal plane against the aggressive surface formed by the grooves 81 on the barbs 82. Pushing against the barbs 82 moves the latching fingers 78 so that they can pass through the openings 92 in the front wall 90 of the bait station 20. Once the bait station 20 is released from the latching fingers 78 it can be rotated out of the horizontal plane until the holes 76 in the rear wall 72 can be lifted over the posts 66 mounted to the mounting structure 68, thereby releasing the bait station 20 from the base 22.

The base 22 is preferably an injection molded part formed as a single piece. The ramp 60 shown in FIG. 2 provides easy access for rodents to the openings in the side walls 32 of the bait station. As rodents can readily climb vertical walls, the form of the ramp is not critical. The ramps 60 terminate at flat triangular surfaces 94 which form part of the platform 62. The platform need have relatively little support area because the bait station 20 is not highly loaded on the platform. The platform 62 mainly serves the function of positioning the bait station 20 in conjunction with the mounting structure 68, the posts 66, and the latching fingers 78. The ballast tray 46 has side walls which extend downwardly from the platform 62 terminating in the floor 96 which lies substantially in a plane defined by the lower peripheral edge 58 of the base 22. The floor 96 has portions defining a number of holes, the larger central hole 98, shown in FIG. 2, may be used with a ground anchor 44 as illustrated in FIG. 3 or an anchor such as a duck bill. The smaller holes 100 may be used with drywall screws 40 or similar anchors to attach the base to a wood or plastic floor deck. For convenience of injection molding, the ballast tray 46 may be open to an empty space underneath the mounting structure 68 to allow the pavers to overhang underneath the mounting structure to obtain, for example, a total brick containment space slightly over 8"×8"×2.5" which will accommodate one or two of a large range of pavers and bricks with a total weight of approximately 8 to 10 pounds. The base 22 can also be attached to a structural member of a building by using wire or cord, as illustrated in FIG. 3, between either the holes 100 in the floor 96 of the tray 46, together with holes 102 formed in an outer wall 104 of the mounting structure 68 or in other parts of the base shell 57.

Figure 10:
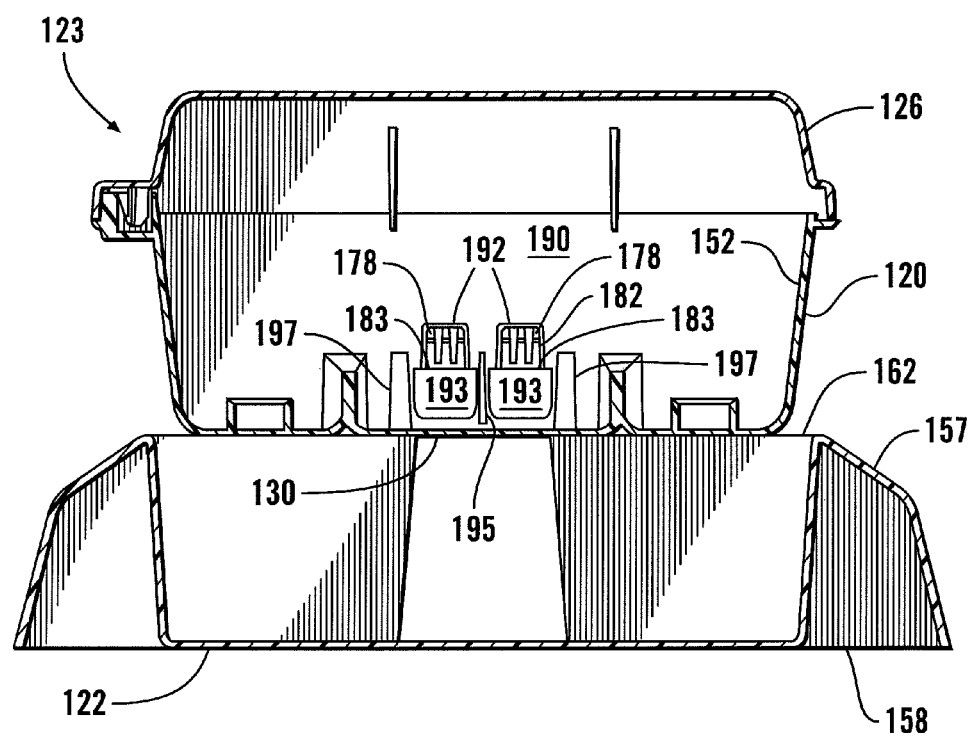
FIG. 10 is a cross-sectional view of the bait station of FIG. 8 showing an inside view of the locking arrangement between the bait station and the bait station base.
Figure 8:
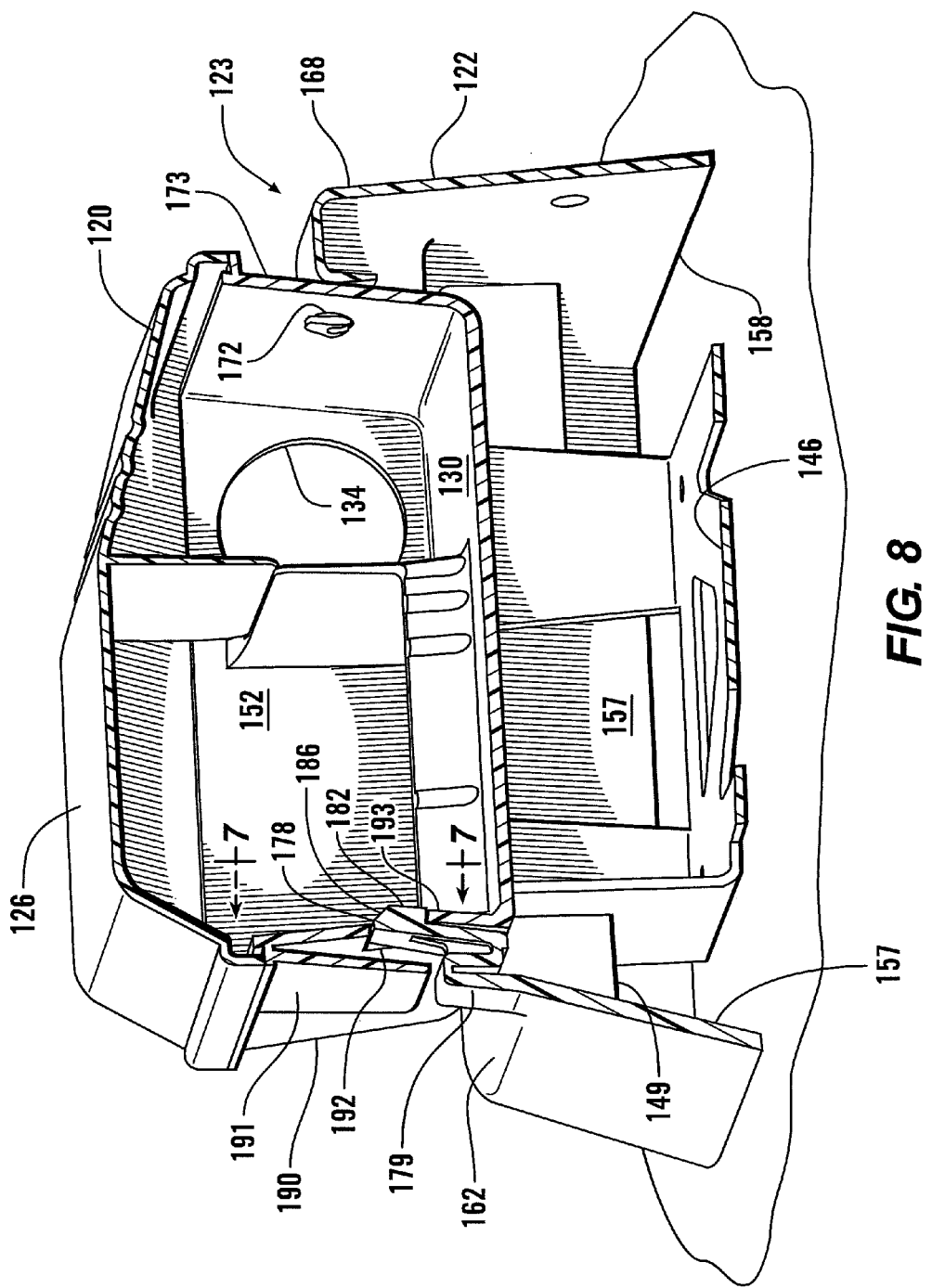
FIG. 8 is a side elevational cross-sectional view of an alternative embodiment bait station mounted to an alternative embodiment base of this invention.
Figure 9:
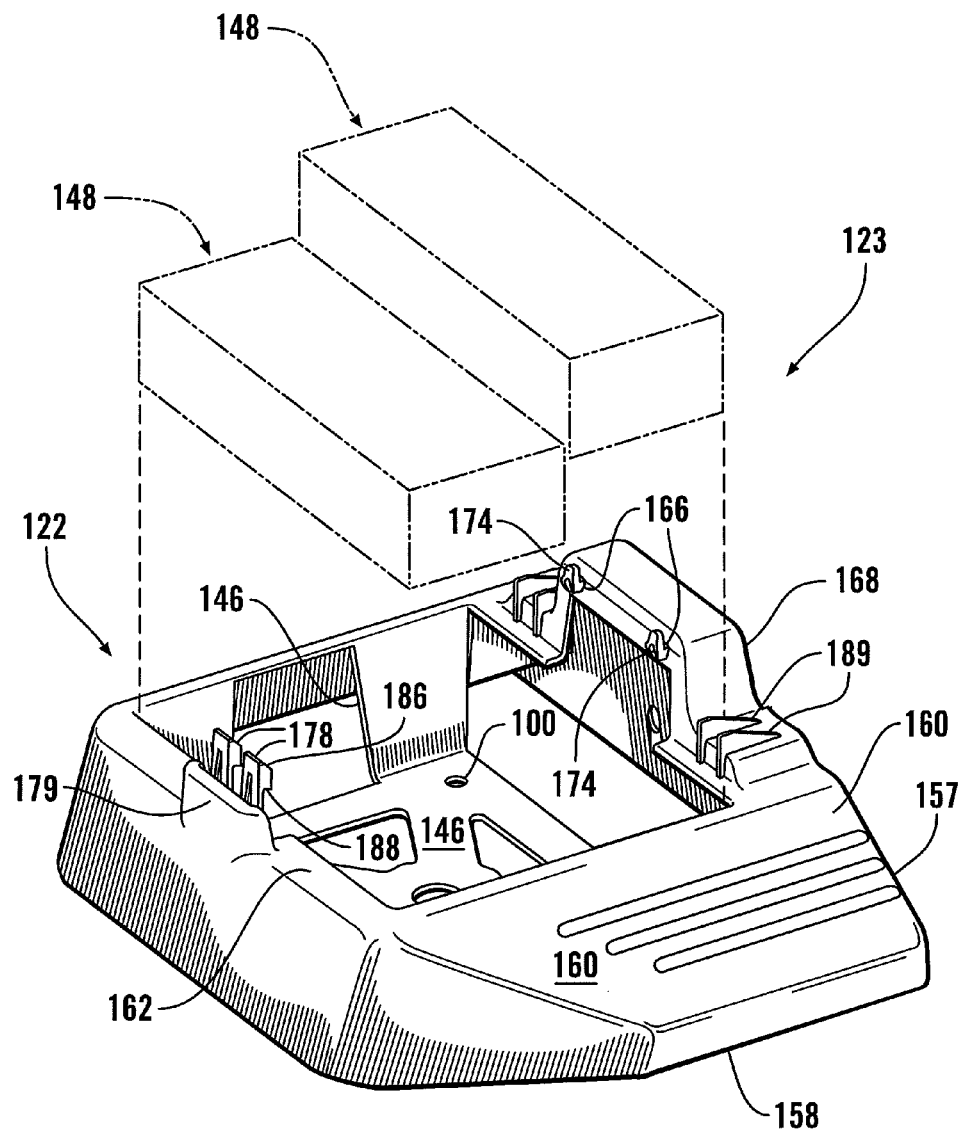
FIG. 9 is an isometric view of the base of FIG. 8, with weights shown in exploded view.

An alternative embodiment bait station system 123 is shown in FIGS. 8, 9, and 10. The alternative bait station system 123 employs a bait station 120 which has substantial similarities with the bait station disclosed in U.S. Pat. No. 6,397,517, the disclosure of which is incorporated by reference herein. The bait station 120 illustrates the rodent access holes 134 necessary to the function of a bait station. The bait station 120 is releasably attachable to a base 122, with an approach similar to that disclosed with respect to the bait station system 23. The base 122, as shown in FIG. 9, is preferably an injection molded shell 157 which has a lower peripheral edge 158 and symmetrically arranged ramps 160 which extend upwardly to a platform 162 which underlies the bait station 120. As shown in FIG. 9, the base 122 has a mounting structure 168 from which extend a plurality of posts 166. As shown in FIG. 8, the posts have locking portions 174 which engage with holes 172 formed in a rear wall 173 of the bait station 120. The post 166 interlocking portions 174 are engaged with the rear wall 173 in a manner similar to that described with respect to the bait station 20 above.

As shown in FIGS. 8 and 9, latching fingers 178 with protruding barbs 182 extend upwardly from the base 122 as part of a second and shorter bookend structure 179. As shown in FIG. 10, the fingers 178 engage within openings 192 formed by portions of the bait station front wall 190. The latching downwardly facing surfaces of the barbed latching fingers 178 engage with lower edges 183 of the bait station openings 192. The fingers 178 prevent the front of the bait station 120 from being pivoted upwardly, which, in cooperation with the posts 166 shown in FIG. 9, effectively locks the bait station 120 to the base 122. The barbed latching fingers 178 are located opposite the mounting structure 168, and are formed with the injection molded shell 157. The latching fingers 178 extend upwardly from the platform 162 and the shorter bookend structure 179. A portion of each of the latching fingers 178 forms a downwardly facing surface similar to the surface 88 illustrated in FIG. 5. As shown in FIG. 8, upwardly facing inclined ramps 186 are formed on the base barbed fingers 178. When the bait station 120 is pressed downward to overlie the platform 162, the bait station front wall 190 engages the base finger ramps 186 to deflect the fingers outwardly until the deflected fingers 178 pass into the holes 192 and fingers return to their undeflected position and pass through the holes in the front wall 190. As shown in FIG. 10, the locking surfaces of the barbed fingers 178 then overlie the lower edges of the openings 192, preventing the upward movement of the front wall 190, thereby locking the bait station 120 to the base 122. A pair of key locks (not shown) similar to the key lock 50 illustrated with respect to the bait station 20 of FIG. 1 prevents access through the hinged lid 126 to the interior 152 of the bait station 120. As shown in FIG. 8, a shroud 191 similar to the shroud 91 shown in FIG. 7 prevents access to the fingers 178 as they extend upwardly along the wall 190. The shroud 191 also has an intermediate rib (not shown) extending from the front wall between the openings 192 as described with respect to the shroud 91.

When the bait station 120 is connected to the base 122 as shown in FIG. 10, the locking fingers 178 extend through the front wall openings 192 and the barbs 182 are engaged with the lower edges 183 of the openings 192. The lower edges 183 of the openings are defined by the upper edges of the wall portions 193. A blade stiffener 195 extends between the wall portions 193, and L-shaped stiffeners 197 extend upwardly from the floor 130 to stiffen the front wall 190 to prevent distortion if an attempt is made to forcibly separate the bait station 120 from the base 122.

The base 122 shown in FIG. 9 is very similar to the base 22 illustrated in FIG. 2 and incorporates a tray 146 of similar dimensions to the tray 46 illustrated in FIG. 2, which can perform the function of retaining one or several ballasting weights such as brick or concrete pavers 148 or other weight elements. The base 122 may be attached to the ground or other structure by any of the mechanisms indicated in FIG. 3. The base 122 has fins 189, shown in FIG. 9, to help to stiffen the combined base and bait station assembly.

FIG. 3 is a schematic illustration of the bait station system 23 illustrated in FIGS. 1 and 2, and serves to illustrate the general principle employed by the bait station system. The bait station system 23 has two basic parts: a bait station 20 having those features which are arranged to dispense rodenticide to rodents, or to contain rodents traps, within the interior of the bait station, and a base 22 which has multiple structures arranged to allow anchoring the base to another structure, typically the floor or ground but possibly also to a post or beam. A locking mechanism 73 which extends between the base 22 and the bait station 20 locks the bait station to the base, wherein the locking mechanism can only be undone when access is obtained to the interior 52 of the bait station. In addition to the illustrated base resilient fingers 78 which engage with the bait station through holes in the front wall 90, other locking mechanisms could be employed, for example those using a removable piece within the bait station which prevents the withdrawal of projections extending into the bait station from the base, similar in function to a cotter pin arrangement. The bait station in turn is constructed to prevent access to the bait station interior without a key.

It should be understood that a keylock in the context of this application can include a cable tie which functions as the key and part of the lock, the cable tie passing through a hole in the lid and a hole on the box to lock the lid to the box of the bait station.

It is understood that the invention is not limited to the particular construction and arrangement of parts herein illustrated and described, but embraces all such modified forms thereof as come within the scope of the following claims.

We claim:

1. A rodent bait station for engagement with a base having projecting posts and upwardly projecting elastically biased fingers, the bait station comprising:
   a molded plastic box having an interior volume defined by a floor and a plurality of upwardly extending side walls, at least one of said plurality of upwardly extending side walls having at least one opening to permit entry and egress of rodents;
   wherein the plurality of upwardly extending side walls includes a rear wall and a front wall opposite and spaced frontwardly of the rear wall with the interior volume defined therebetween;
   wherein the rear wall has portions defining a first pair of holes which are spaced apart along a first axis which is parallel to the floor;
   wherein the front wall has portions defining a pair of frontwardly facing finger holes which communicate directly with the interior volume, wherein the finger holes are spaced apart along a second axis which is parallel to the floor, the pair of finger holes being positioned to receive the fingers extending up from the base;
   wherein the front wall defines a surface exterior to the interior volume, and
   a shroud extending from the front wall, the shroud having downwardly extending portions of a first length which are spaced from the surface exterior to the interior volume to cover at least a portion of said pair of finger holes in said front wall to thereby define a downwardly opening gap between the shroud and the front wall positioned to receive portions of the fingers from below and exterior to the box, and the shroud thereby shielding the fingers from operation from outside the bait station.

2. The rodent bait station of claim 1 wherein a lid is formed as a single piece with the box, the lid being connected to one of the plurality of side walls by an integral hinge.

3. The rodent bait station of claim 1 wherein the shroud covers and wraps around the finger holes in the front wall.

4. The rodent bait station of claim 3 further comprising an intermediate rib which extends from the front wall between the finger holes to a midpoint of the shroud, so that the shroud is attached along three lines to the bait station front wall.

5. A bait station system comprising:
   a bait station for containing rodenticide or rodent traps comprising:

a molded plastic box having a floor and upwardly extending side walls with at least one opening to permit entry and egress of rodents;

a lid joined by a hinge to the box, wherein the lid is pivotal on the hinge to selectively cover and uncover the box, an interior being defined within the box;

a keyed lock mounted between the molded plastic box and the lid for locking the lid with respect to the box;

portions of the box side walls defining a rear wall, and a front wall opposite the rear wall;

wherein portions of the rear wall form at least one mounting hole;

wherein portions of the front wall form at least one front mounting hole which communicates directly with the box interior;

a shroud which extends from the bait station front wall to cover at least a portion of the at least one front mounting hole;

a base comprising:

a molded plastic support structure having a lower peripheral edge and a platform defining a plane positioned above the lower peripheral edge, wherein the bait station is releasably mounted to the molded plastic support structure so that the bait station extends upwardly from the platform;

wherein first portions of the support structure form a tray extending downwardly beneath the platform, the tray defining an upwardly opening cavity for holding at least one weight in a position beneath the platform;

wherein second portions of the support structure form a mounting structure which extends above the platform, the mounting structure having a first post which extends above the plane defined by the platform, the first post being positioned to extend into the at least one bait station mounting hole in the rear wall; and third portions of the molded plastic support structure forming an upwardly extending elastically biased first latching finger which extends upwardly from the base and is spaced from and opposite the first post, the first latching finger being positioned to extend to the at least one front mounting hole in the front wall when the bait station is brought to overlie the platform of the base, the first latching finger being deflectable so as to pass along the front wall and resilient so as to enter the at least one front mounting hole in the front wall and thus to engage portions of the front wall, portions of the first latching finger being shielded by the bait station shroud from operation from an outside of the bait station.

6. The bait station system of claim 5 wherein the at least one mounting hole in the rear wall further comprises at least two mounting holes; and wherein the at least one front mounting hole of the front wall further comprises at least two front mounting holes; and wherein the mounting structure which extends above the platform further comprises a second post which extends above the plane defined by the platform, the first post and the second post being positioned to extend into the at least two mounting holes in the rear wall; wherein the third portions of the molded plastic support structure form a second elastically biased latching finger which extends upwardly from the base and is spaced from and opposite the posts, the first latching finger and the second latching finger being positioned to extend into the at least two front mounting holes in the front wall when the bait station is brought to overlie the platform of the base, the latching fingers being deflectable so as to pass along the front wall and resilient so as to enter the at least two front mounting holes in the front wall and thus to engage portions of the front wall.

7. The bait station system of claim 5 wherein the first post has a distal end, and locking portions which extend upwardly of the distal end, and wherein the at least one mounting hole of the rear wall is sized such that the locking portions of the first post cannot pass through said at least one mounting hole of the rear wall when the at least one mounting hole of the rear wall is moved parallel to the plane defined by the platform.

8. The bait station system of claim 5 further comprising:

a second post extending from the mounting structure spaced in parallel relation to the first post and spaced apart from the first post;

portions of the bait station side walls which define a second mounting hole, positioned to receive the second post therethrough and spaced from the at least one mounting hole in the rear wall along a first axis which is parallel to the floor;

a second latching finger which is parallel to the first latching finger; and other portions of the bait station front wall which define a second front mounting hole positioned to receive the second latching finger therethrough and spaced from the at least one front mounting hole along a second axis which is parallel to the floor.

\* \* \* \* \*